US008206769B2

(12) United States Patent
Alvarez et al.

(10) Patent No.: US 8,206,769 B2
(45) Date of Patent: Jun. 26, 2012

(54) METHOD FOR SEPARATING BANANA PULP FROM ITS PEEL

(75) Inventors: Rafael Angel Lopez Alvarez, Pococi (CR); Raul Fernandez, Weston, FL (US); Illya Ilyin, St. Petersburg (RU); Jose T. Mejia, Harvey, LA (US); Luis Guillermo Bonilla Murillo, Heredia (CR); Elena Nunez, Cincinnati, OH (US); Audrey Parienov, St. Petersburg (RU); Julio Schouwe, Pococi (CR); Julio Vasquez, Batavia, OH (US); James H. Wiley, Camden, SC (US)

(73) Assignee: Chiquita Brands International Inc., Cincinnati, OH (US)

( * ) Notice: Subject to any disclaimer, the term of this patent is extended or adjusted under 35 U.S.C. 154(b) by 0 days.

(21) Appl. No.: 12/979,464

(22) Filed: Dec. 28, 2010

(65) Prior Publication Data

US 2011/0091624 A1    Apr. 21, 2011

Related U.S. Application Data

(62) Division of application No. 11/464,357, filed on Aug. 14, 2006, now Pat. No. 7,861,648.

(60) Provisional application No. 60/708,923, filed on Aug. 17, 2005.

(51) Int. Cl.
*A23L 1/212* (2006.01)

(52) U.S. Cl. .......................................... 426/482; 426/615
(58) Field of Classification Search .................. 426/482, 426/615
See application file for complete search history.

(56) References Cited

U.S. PATENT DOCUMENTS

| 3,482,615 A | 12/1969 | Green et al. |
| 3,627,011 A | 12/1971 | Pond |
| 4,157,065 A | 6/1979 | Schinko |
| 4,921,709 A | 5/1990 | Sole |
| 6,561,361 B2 | 5/2003 | Sebright et al. |

FOREIGN PATENT DOCUMENTS

| AU | 87391 | 6/1997 |
| BE | 388605 | 6/1932 |
| DE | 3 731 042 | 3/1989 |
| GB | 977832 | 12/1964 |

*Primary Examiner* — Anthony Weier
(74) *Attorney, Agent, or Firm* — Frost Brown Todd LLC

(57) ABSTRACT

A large scale processing method for separating banana pulp from its peel is shown. In this method bananas are separated into two parts (generally in a transverse direction), each part having a tip end and a cut end. A compression force is applied to those banana parts such that the force increases from the tip end to the cut end. A device which implements that process, including a cutting device, a means for feeding bananas into the cutting device, and two processing conveyor devices (to apply the compression force to the banana parts), is also shown.

2 Claims, 3 Drawing Sheets

METHOD FOR SEPARATING BANANA PULP FROM ITS PEEL

RELATED APPLICATION

This application is a divisional of application Ser. No. 11/464,357, filed Aug. 14, 2006, to be issued as U.S. Pat. No. 7,861,648 on Jan. 4, 2011, which claims priority from provisional application Ser. No. 60/708,923 filed Aug. 17, 2005 incorporated herein by reference.

FIELD OF THE INVENTION

The invention is related to methods and devices for separation of fruit pulp from its peel, specifically, for the separation of banana pulp from peel during large-scale processing.

BACKGROUND OF THE INVENTION

Different methods for separation of pulp from peel are known.

For example, U.S. Pat. No. 4,157,065, "Juice extractor", Schinko, issued Jun. 5, 1979, describes a device for extraction of juice from fruits. The device includes a drum, the external surface of which is embraced by a closed ring-shaped belt with holes. Another belt, spring-controlled by rollers, is situated above the first belt. Fruits or other plant products are placed between the belts. The gap between the belts decreases in the direction of the product movement, the decrease in separation pressing out the juice from the fruit.

U.S. Pat. No. 6,561,361, "Belt filter press with improved wedge section", Sebright et al., issued May 13, 2003, describes a device for expressing moisture from a substance. This device includes two conveyer belts that converge and deflect downwards, in the direction of the force of gravity.

German patent DE 3731042, "Device for expressing liquid from moist compounds", issued Mar. 30, 1989, describes a device for expressing liquid, (for example, juice from fruits). The device includes two liquid-permeable conveyer belts, under which there are plates that form a pressing chamber.

U.S. Pat. No. 3,482,615, "Apparatus for and method of removing pulp from a banana", Green et al., issued Sep. 27, 1967, describes a device for separation of banana pulp from banana peel. The device includes a feeding conveyer and a pair of revolving rollers, between which banana pulp is pressed out from the peel. The bananas are put on the feeding conveyer with their tips or stems oriented in the direction of the rollers. The transporting conveyer feeds the banana toward the rollers, and its tip or stem gets into the gap between the rollers. The banana peel is thus captured by the surface of the rollers and pulled in between them. Under the pressure of the rollers, the banana peel tears. The pulp is pressed out of the peel and falls into the gap between the edge of the feeding transporting conveyer and the rollers. Further along, the banana pulp gets to the belt of another conveyer, and is delivered for subsequent processing. Since the operation of this device is based on jamming the banana with a significant force required for the tearing of the peel, the pressing-out is accompanied by partial jamming of the banana pulp up to a puree-like state.

SUMMARY OF THE INVENTION

The present invention related to a device capable of separating banana pulp from its peel, without jamming (even partial) of the pulp.

The method of the present invention includes the following steps. The banana is cut into multiple (generally two) parts. Then, a compressing force is applied to the tip of each part, increasing from the tip toward the cut. The adhesion force of the banana pulp to the peel is not significant, the pulp is sufficiently elastic, and the external surface of the skin is not slippery, so that the force needed to press the pulp out of the peel is relatively small. Therefore, the pulp remains practically intact as it is pressed out.

While it is preferable to cut the banana crosswise, it is also possible to cut it not precisely crosswise, even lengthwise, and it is possible to also feed whole bananas into the system but with a reduction of yield and efficiency. It is better to cut the banana into two approximately equal halves—this would allow using the same types and structures of pressing elements throughout the device.

The device includes a cutting element that allows for the banana to be cut into two halves, and, one or more, generally two conveyer-type pressing devices installed after the cutting device, each intended for one of the cut banana parts. The pressing devices diverge horizontally from the cutting element, and each has a lower (feeding) belt and an upper (pressing) belt. The feeding and pressing belts are installed with a gap between them that narrows in longitudinal cross-section in the direction away from the cutting device, and narrows in transverse cross-section in the direction from the internal to the external edges of conveyer belts.

During operation of the device, the banana is transported to the cutting element (via corresponding means for transporting), where it is cut into two parts. The cutting device, in some embodiments, can be a disc knife. The two banana parts are fed to the pressing conveyer devices, which are installed directly after the cutting device, and diverge horizontally, at a small angle to each other.

Each of the cut banana parts is then compressed between two moving conveyer belts, where a compressing force from the banana's tip toward the cut is generated. The compression is exerted in stages, because of the varying gap. Since the gap narrows in longitudinal and transverse cross-section, from the internal to the external edges of the conveyer belt, the pulp is pressed out of the peel. Since each of the cut banana parts will get to the edge of the corresponding pressing conveyer device, the pulp is pressed towards this edge. And, since the conveyer belts diverge, the pressed-out pulp fragments fall down into the gap between the belts.

The bananas can be fed into the device via a feeding conveyer or hopper, in such a way that they can be oriented for transverse cutting. The feeding mechanism can be part of the feeding conveyer belt positioned in front of the cutting device.

As a result of transverse cutting of the banana, the pulp that is pressed in the direction of the cut is oriented to the internal edge of the belts. In this case, the pulp sustains the least amount of damage as a result of processing.

The pressing force of the conveyer device can be generated due to the tension of conveyer belts. However, the best result is attained due to the installation of components generating the necessary gap profile and pressing force under the feeding and above the pressing conveyer belts. These components can be installed rigidly, or with a certain degree of freedom in terms of vertical movement.

In one embodiment, compression plates (for example, spring-pressed) can be installed under the feeding and above the pressing conveyer belts. The pressing force can also be generated by rollers installed under the feeding and over the pressing conveyer belt. The plates or rollers are installed with a certain degree of freedom (i.e., semi-rigidly) to move vertically. Such installation of plates or rollers makes it possible to more precisely specify the pressing force for different bananas and different banana conditions.

BRIEF DESCRIPTION OF THE DRAWINGS

The invention is illustrated with the following drawings.

DETAILED DESCRIPTION OF THE INVENTION

The described method for separation of banana pulp from the peel is implemented in the following way. The banana is first cut into multiple (generally two) pieces. It is preferable to cut the banana in the transverse direction, into two approximately identical parts (roughly, in half). However, the method is implementable even if the banana is not cut precisely in the transverse direction or not cut at all; there is also a method alternative for a banana that is cut longitudinally.

A compression force is applied to the cut banana parts, and the force is gradually increased from the tip of the banana part toward the cut. Upon this application of force, the banana pulp is displaced out of the banana peel. Further on, the banana pulp and peel are separated, and are used separately during subsequent processing.

Figure 1:
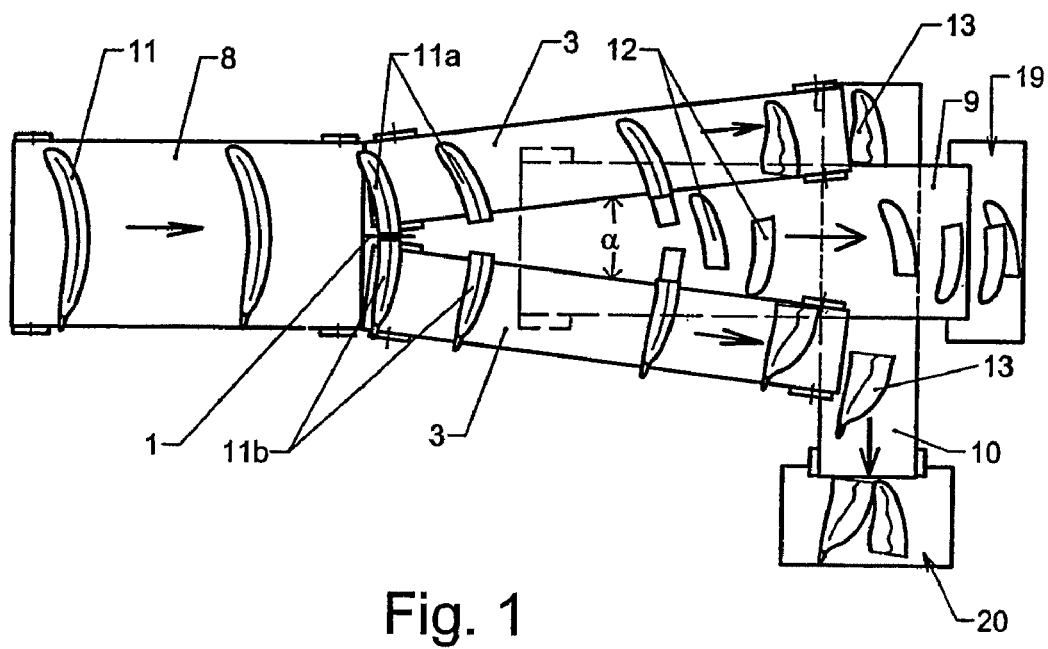
FIG. 1 shows the arrangement of the components, and a kinematic diagram of the device intended for the separation of banana pulp from banana peel, viewed from above.
Figure 2:
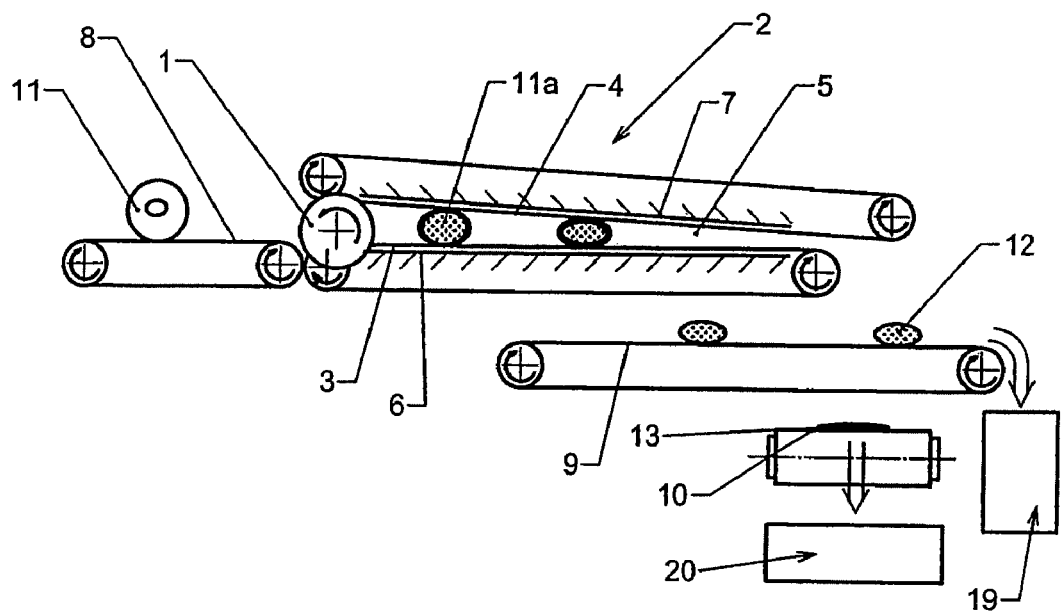
FIG. 2 shows a lateral view of the same device shown in FIG. 1.

A device intended for separation of the banana pulp from its peel (which utilizes the process of the present invention) can be implemented, for example, as shown in FIGS. 1 and 2. It includes a cutting device (1), in this case executed as a disc knife, and two pressing conveyer devices (2), one intended for each of cut banana parts, and embodied as diverging horizontally at an angle ($\alpha$) to each other. Each pressing conveyer device includes a lower feeding conveyer belt (3) and the upper pressing conveyer belt (4).

Figure 4:
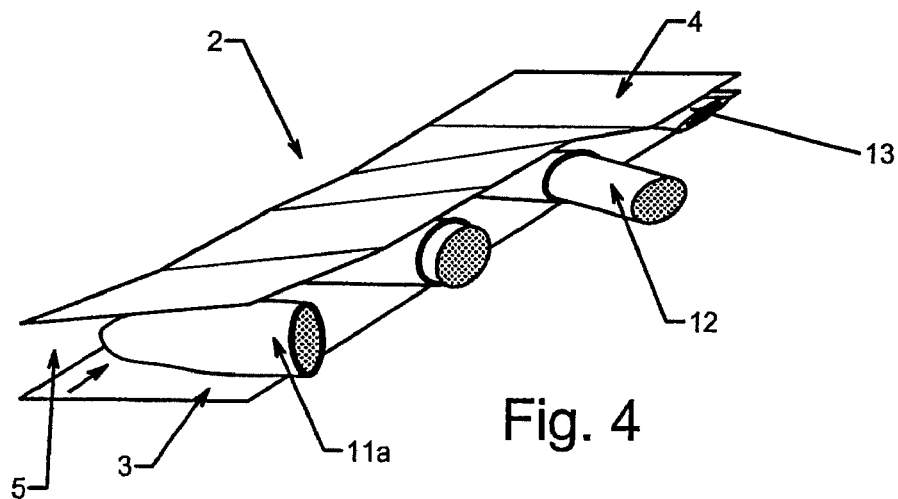
FIG. 4 illustrates the process for pressing out the banana pulp between the belts of the pressing conveyer device.
Figure 5:
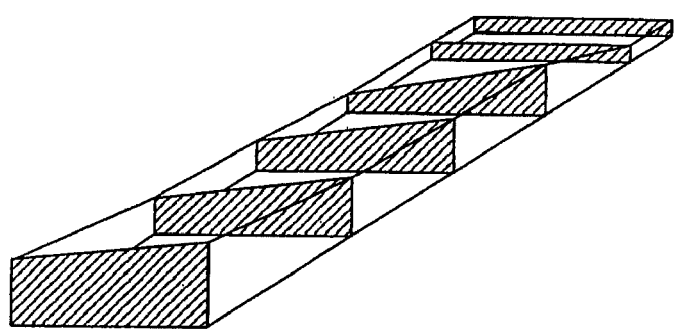
FIG. 5 presents the cross-sections of the gaps between the conveyer belts, illustrating the configuration of the gap in the pressing device.

The design presented in FIGS. 1 and 2 shows two pressing conveyer devices that are installed after the cutting device, which diverge horizontally, at an angle from each other. Feeding and pressing conveyer belts of each of the pressing devices are positioned with a gap (5) between them, narrowing in longitudinal cross-section; that gap narrows in the transverse cross-section, in the direction from the internal to the external edges of conveyer belts, as shown in FIGS. 4 and 5.

The device described here can utilize a variety of embodiments for banana feeding to the cutting device. In particular, FIGS. 1 and 2 present an option where the means for banana feeding is a feeding conveyer (8).

Figure 3:
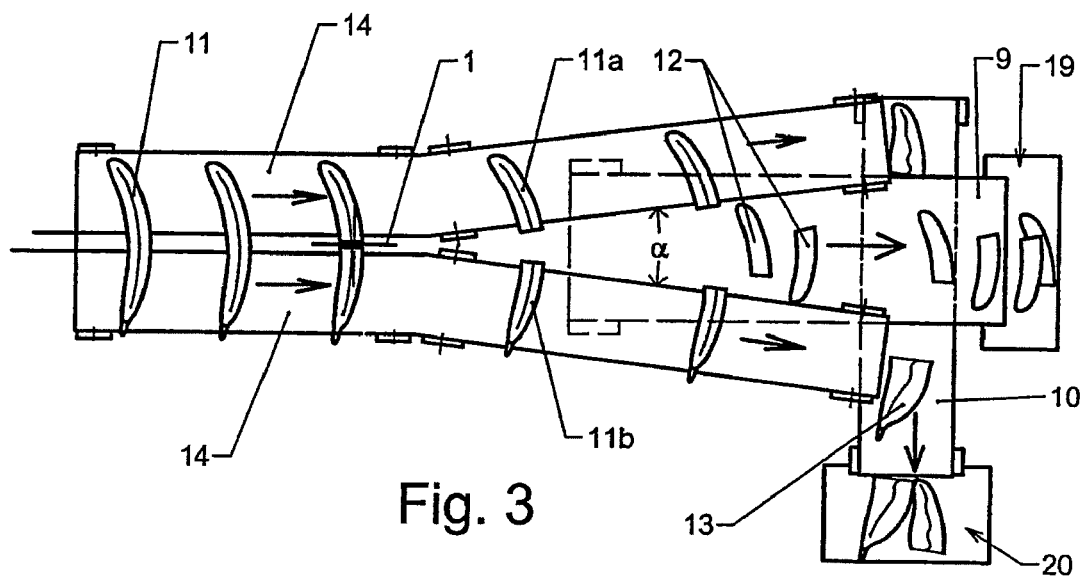
FIG. 3 presents an alternative embodiment of the device in which the means for banana feeding is embodied as a part of the feeding conveyer belts, viewed from above.

FIG. 3 presents a design option where the bananas (11) are fed to the cutting device through two feeding conveyer belts, which are positioned in parallel before the cutting device, and then diverge at an angle.

Figure 7:
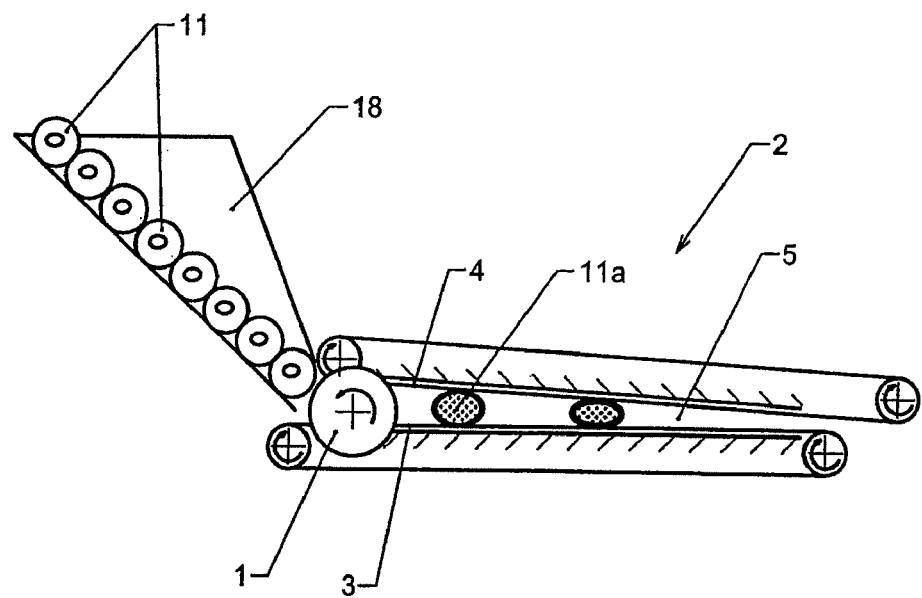
FIG. 7 presents an example of a device with the means for banana feeding in the form of a hopper.

FIG. 7 presents an example of the device where the bananas are fed to the cutting device via the use of a hopper (18), in which the required orientation of bananas occurs prior to cutting.

The device claimed herein is designed so that after cutting, the banana pulp (12) gets to one transporting conveyer (9), while the peel (13) to the other transporting conveyer (10) (See FIGS. 1, 2, and 3). The two transporting conveyers are generally positioned in different planes, perpendicular to each other (See FIG. 2). At the exit end of the transporting conveyers, there are two vessels (19 and 20) intended for the collection of banana pulp and peel, correspondingly.

The two pressing conveyer devices each include a lower feeding conveyer belt and an upper pressing conveyer belt (See FIG. 4). The gap between these belts has a varying cross-section, both longitudinally and in transverse, as shown in FIGS. 4 and 5.

To generate a compression force on the cut banana parts, the device can make use of compression plates, rollers, or combinations of these components. In particular, FIG. 2 shows a guideline (6) made of rigid metal (such as steel, for example) that is installed under the lower feeding conveyer belt, and another guideline (7) that is installed above the upper conveyer belt. These guidelines can either be fixed in place rigidly, or with a certain degree of vertical mobility; for example, they can be spring-pressed, which allows the operator to control the pressing force.

Figure 6:
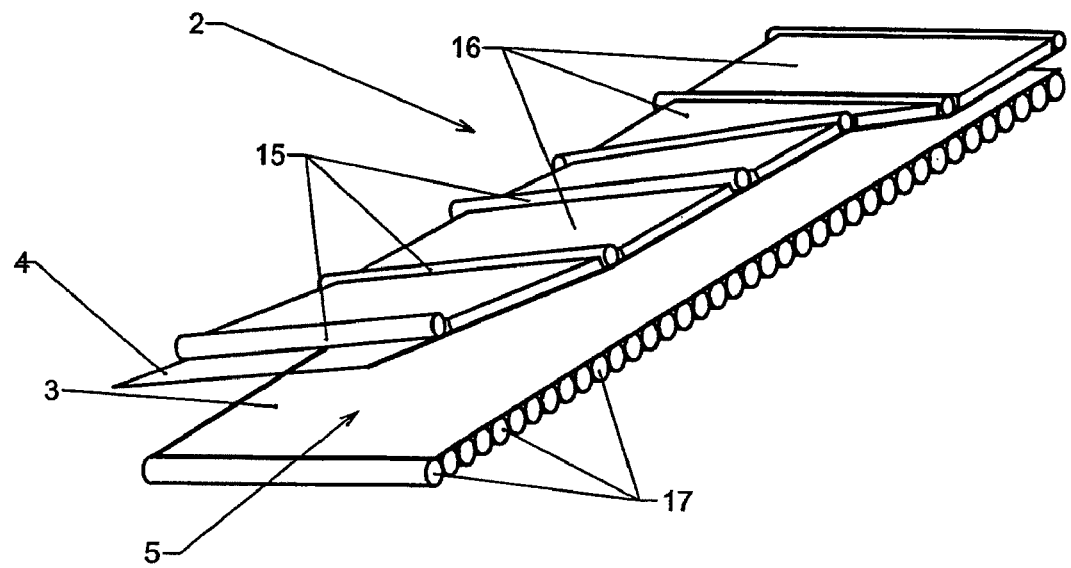
FIG. 6 presents an example of a pressing conveyer device.

FIG. 6 shows another alternative for a pressing conveyer device. One set of rollers (17) is installed under the lower feeding conveyer belt, while another set of rollers (15) alternating with rigid plates (16) is installed above the upper feeding conveyer belt.

The device described herein operates in the following way. The bananas (see FIGS. 1, and 2) are fed to the cutting device via some means (in this case, across the belt of the feeding conveyer). After a banana is cut, two banana parts are generated (11a and 11b). One part (11a) gets to one pressing conveyer device, while the other part (11b) to the other pressing conveyer device. (It is possible to design a device where both banana parts go to a single pressing conveyor device.) In the pressing conveyer devices, the banana parts get between the lower and upper feeding conveyer belts (See FIG. 4). Due to the above-described cross-section of the gap between the belts, a pressing-out force is applied to the banana parts, gradually increasing from the part's tip toward the cut. The banana pulp thus slips out of the peel. Further on, the pulp gets to the conveyer (FIGS. 1 and 2) located between the pressing conveyer devices. Then, the pulp goes to a designated vessel (19). The peel goes to the transporter (10) and then, to another vessel (20).

In another design alternative of the device, presented in FIG. 3, the bananas are put onto two lower feeding conveyer belts crosswise, and are then cut with a cutting device. Further operation of this device is similar to the operation of the device presented in FIGS. 1 and 2.

The present invention provides the ability to mechanize the process of separating banana pulp from its peel, where the pulp remains largely undamaged.

What is claimed is:

1. A method for separation of pulp from the peel of a banana, consisting essentially of cutting said banana into two parts, and applying a compression force to each of the banana parts, wherein said force gradually increases from the tip of the banana part to the cut, wherein the compression force is applied using a substantially flat conveyor belt pressing device, and wherein re-orientation of the banana parts is not required.

2. The method according to claim 1, wherein the bananas are cut in the transverse direction.

* * * * *